United States Patent [19]

Bowers

[11] 3,984,116
[45] Oct. 5, 1976

[54] FOLDABLE REPAIR CREEPER

[75] Inventor: Richard C. Bowers, East Orange, N.J.

[73] Assignee: The Raymond Lee Organization, Inc., New York, N.Y.; a part interest

[22] Filed: July 28, 1975

[21] Appl. No.: 599,707

[52] U.S. Cl. .............................. 280/32.6; 280/651
[51] Int. Cl.² ........................................ B62B 11/00
[58] Field of Search ............... 280/32.6, 79.1, 36 R, 280/651

[56] References Cited
UNITED STATES PATENTS

| 1,098,262 | 5/1914 | Hollingshead | 280/32.6 |
| 1,209,447 | 12/1916 | Johnson | 280/32.6 |

Primary Examiner—Robert R. Song
Attorney, Agent, or Firm—Howard I. Podell

[57] ABSTRACT

A wheeled creeper for use in repairing the undersides of a vehicle, upon which the user may propel himself under the vehicle, with means to unfold the creeper from a compact configuration so as to form a rigid frame in the extended position. The creeper is formed of three panels, with the middle panel hinged on each side to an outer panel so that the two outer panels may fold about the middle panel, and a frame in the form of two parallel sets of retractable rails, with the rails in the retracted position fastened to one of the outer panels. A caster wheel is mounted to each segment of the retractable rails so that when the rails are extended, a caster wheel supports each rail, and an unfolded panel section that lies on the rail.

3 Claims, 6 Drawing Figures

FOLDABLE REPAIR CREEPER

SUMMARY OF THE INVENTION

My invention is a wheeled creeper for use in repairing the undersides of a vehicle, upon which the user may propel himself under the vehicle, with means to unfold the creeper from a compact configuration so as to form a rigid frame in the extended position. The creeper is formed of three panels, with the middle panel hinged on each side to an outer panel so that the two outer panels may fold about the middle panel, and a frame in the form of two parallel sets of retractable rails, with the rails in the retracted position fastened to one of the outer panels. A caster wheel is mounted to each segment of the retractable rails so that when the rails are extended, a caster wheel supports each rail, and an unfolded panel section that lies on the rail.

Because of the compact nature of the invention in the folded configuration, it may be readily stored in the cab of a truck so as to be available for emergency roadside use when required.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
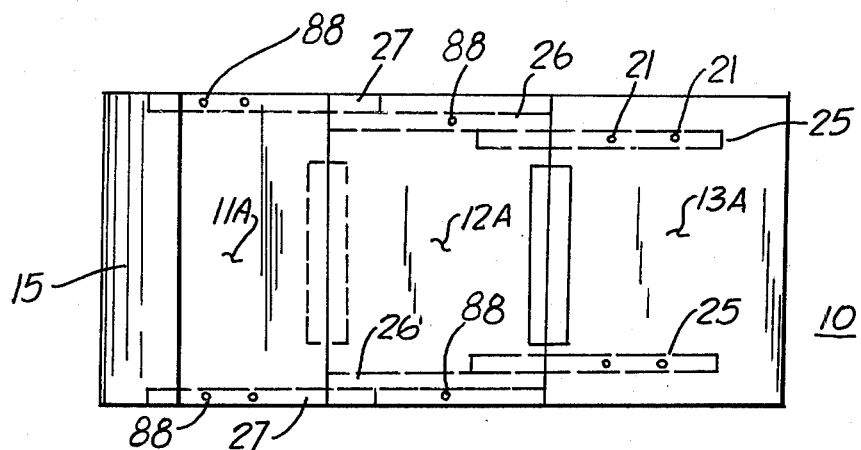
FIG. 1 is a plan view of the invention in the extended position.
Figure 2:
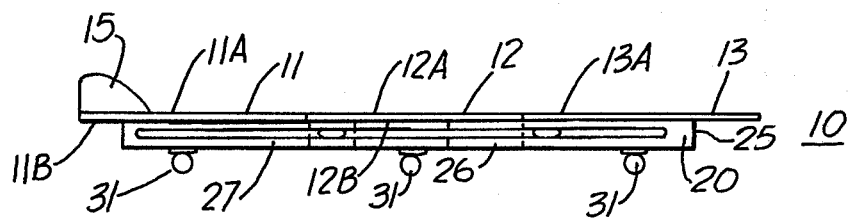
FIG. 2 is a side view of the invention in the extended position.
Figures 3, 4:
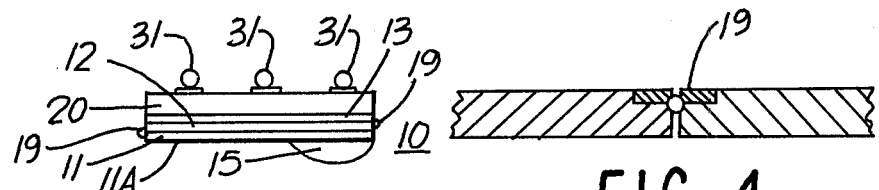
FIG. 3 is a side view of the invention in the folded position.
FIG. 4 is a side view of the hinge joining two panels.
Figures 5, 6:
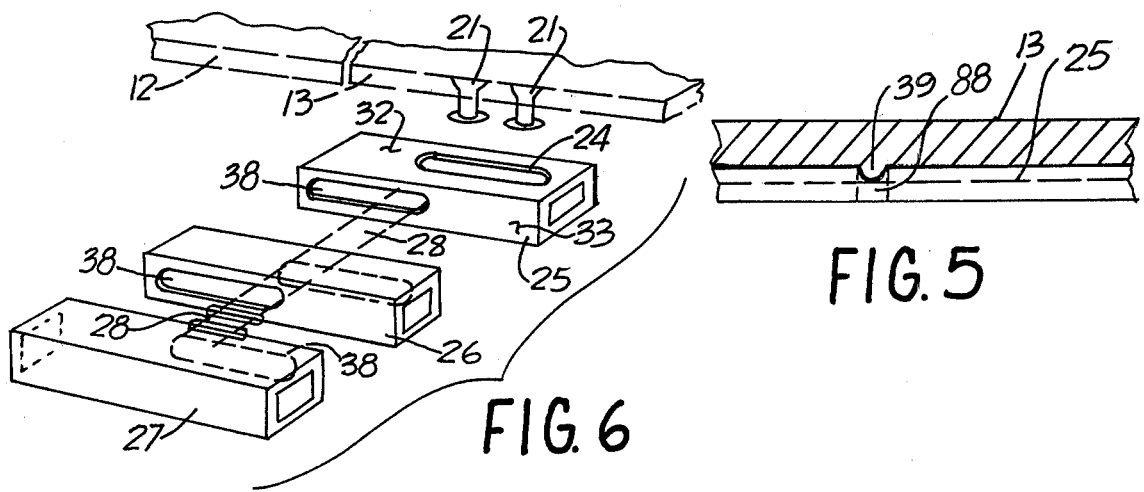
FIG. 5 is a sectional view of a panel and latching pin fitting into a frame rail recess, in the extended position.
FIG. 6 is an exploded perspective view of a set of frame rails.

Turning now descriptively to the drawings, in which similar reference characters denote similar elements throughout the several views, FIGS. 1-6 illustrate the creeper 10 which may be extended for use as shown in FIGS. 1-2 or folded to a compact shape as shown in FIG. 3.

Three flat panels 11, 12 and 13 of similar rectangular shape are joined together by hinges 19 so that mid panel 12 may be folded with the top surface 12A of panel 12 lying against the top surface 13A of foot end panel 13 and the bottom surface 11B of head end panel 11 abutting the bottom surface 12B of mid panel 12 as shown in FIG. 3. A head rest 15 is mounted to the top surface 11A of head end panel 11.

A retractable frame 20 is slidably fastened to the bottom surface 13B of foot end panel 13 so as to extend in the extended mode under all three panels 11, 12 and 13.

Frame 20 is formed of two parallel sets of expandable rails 25, 26 and 27. Since both sets of the frame 20 are identical, the description of one set of said rails will serve for both sets.

A rectangular shaped rail 25 is fitted with the through slot 24 in rail side 32 which rail side 32 abuts the bottom surface 13B of foot end rail 13, with a pair of counter sunk rivets 21 fastened in panel 13 passing through slot 24 of rail 25 so that rail 25 may slide longitudinally from a first position, shown in FIG. 3 in which the ends of rail 25 are flush with the ends of panel 13 to a second position shown in FIGS. 2 and 3 in which rail 25 passes under the axis line of hinge 19 which joins mid panel 12 to foot end panel 13. A through slot 38 is formed in a rail side 33 adjoining and perpendicular to rail side 32 through which a flat pin 28 slidably joins rail 25 to adjoining rail 26 through a similar slot 38 in rail 26. Rail 26 is similarly joined by a second flat pin 28 to a similar rail 27 by means of second pair of slots 38 in rail 26 and a similar slot 38 in rail 27.

Each rail 25, 26 and 27 is of a length that is equal to or less than the length of a panel 11, 12 or 13 taken in the longitudinal direction of the extended creeper 10, as shown in FIG. 3, so that in the retracted position of the rails 25, 26 and 27 they lie against end panel 13 within the profile of the folded panels 11, 12 and 13.

A caster wheel 31 is fixed to the underside of each rail 25, 26 and 27 so that in the extended form, each caster wheel 31 supports a rail 25, 26 or 27 and a panel 11, 12 or 13 resting on the said rail.

The side of each rail 25, 26 and 27 adjoining the bottom surface 11B, 12B and 13B respectively, of the panels in the extended form is fitted with a hole 88 which engages a rounded projection 39 joined to the bottom surface 11B, 12B or 13B of the respective panel with holes 88 and projections 39 located so as to engage when the rails are extended to the extended position shown in FIGS. 1-2.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A wheeled creeper, upon which a person may lie in order to work under a vehicle, said creeper formed with panels that are hinged together so that the panels may be extended along a common axis and supported by a retractable rail assembly fitted with wheels or alternately folded together in parallel configuration, in which a retractable frame rail assembly is fastened to the undersurface of one panel, said rail assembly being expandable in length to fit under and support all panels of the creeper when the panels are unfolded, said rail assembly comprising a plurality of individual segments of rails mounted side-by-side and slidably fastened to each other, with a first rail segment fastened to the undersurface of one end panel and with the remaining rail segments of a length to extend along the length of the creeper under all the panels when the said panels are extended along a common axis, with each rail segment not longer than the length of the panel to which the first segment is fastened, along the direction of said common axis, with at least one caster wheel mounted to the underside of each rail segment.

2. The combination as recited in claim 1 in which two retractable frame assemblies are mounted in parallel configuration to the underside of the creeper.

3. The combination as recited in claim 1 in which the first rail segment is slidably fastened to a panel which serves as an end panel, in the extended position of the creeper.

* * * * *